(12) United States Patent
Polack et al.

(10) Patent No.: US 10,215,242 B2
(45) Date of Patent: Feb. 26, 2019

(54) ELECTROMAGNETIC ACTIVE BRAKE

(71) Applicant: RINGSPANN GmbH, Bad Homburg (DE)

(72) Inventors: Hans-Joachim Polack, Ortseil Neundorf (DE); Hartmut Bischoff, Stassfurt (DE)

(73) Assignee: RINGSPANN GmbH, Bad Homburg (DE)

( * ) Notice: Subject to any disclaimer, the term of this patent is extended or adjusted under 35 U.S.C. 154(b) by 0 days.

(21) Appl. No.: 15/605,124

(22) Filed: May 25, 2017

(65) Prior Publication Data
US 2017/0261050 A1 Sep. 14, 2017

Related U.S. Application Data

(63) Continuation of application No. 14/781,477, filed as application No. PCT/DE2014/000210 on Apr. 22, 2014, now Pat. No. 9,683,619.

(30) Foreign Application Priority Data

Apr. 30, 2013 (DE) .................. 10 2013 007 402

(51) Int. Cl.
*F16D 55/08* (2006.01)
*B60T 13/74* (2006.01)
(Continued)

(52) U.S. Cl.
CPC ............ *F16D 55/08* (2013.01); *B60T 13/741* (2013.01); *B60T 13/748* (2013.01);
(Continued)

(58) Field of Classification Search
CPC ...... F16D 55/08; F16D 55/22; F16D 55/2245; F16D 55/225; F16D 55/2255;
(Continued)

(56) References Cited

U.S. PATENT DOCUMENTS

| 2,254,115 A | 8/1941 | Claytor |
| 2,281,838 A | 5/1942 | Hadley |
| 3,115,956 A | 12/1963 | Trombetta |
| 3,878,922 A | 4/1975 | McCarthy |
| 5,337,878 A | 8/1994 | Mehlert et al. |

FOREIGN PATENT DOCUMENTS

| DE | G8308714 | 12/1983 |
| DE | 69419124 | 6/1999 |

(Continued)

*Primary Examiner* — Thomas J Williams
(74) *Attorney, Agent, or Firm* — Volpe and Koenig, P.C.

(57) ABSTRACT

An electromagnetic active brake which is de-energized in the brake standby state, including—a brake body (1), —a brake device with at least two opposing brake shoes (9, 12) which are spaced from a component to be braked in the de-energized state of the active brake, —and an electromagnet (5) which is arranged in the brake body (1) and the armature (6) of which interacts with a brake lever (2). The armature (6) of the electromagnet (5) is rigidly connected to a spring compressor (3) which is guided in the brake body (1) and which is moved by the armature (6) in the axial direction of the armature (6) when the electromagnet (5) is energized and in this manner clamps a spring (16) against an abutment (20) that interacts with the brake lever (2) and is arranged in an axially adjustable manner in the direction of the path of the spring compressor (3). The active brake according to the invention is highly energy-saving and thus economical.

15 Claims, 4 Drawing Sheets

(51) Int. Cl.
    *F16D 65/18* (2006.01)
    *F16D 55/224* (2006.01)
    *F16D 63/00* (2006.01)
    *F16D 65/095* (2006.01)
    *F16D 65/46* (2006.01)
    *F16D 55/00* (2006.01)
    *F16D 121/14* (2012.01)
    *F16D 121/20* (2012.01)
    *F16D 125/64* (2012.01)

(52) U.S. Cl.
    CPC ....... *F16D 55/2245* (2013.01); *F16D 63/008* (2013.01); *F16D 65/095* (2013.01); *F16D 65/18* (2013.01); *F16D 65/46* (2013.01); *F16D 2055/002* (2013.01); *F16D 2055/0062* (2013.01); *F16D 2121/14* (2013.01); *F16D 2121/20* (2013.01); *F16D 2125/64* (2013.01)

(58) Field of Classification Search
    CPC .... F16D 55/226; F16D 55/2265; F16D 65/18; F16D 2121/14; F16D 2121/18; F16D 2121/20; F16D 2125/64
    USPC ................ 188/156, 158, 161, 163, 171, 166
    See application file for complete search history.

(56) References Cited

FOREIGN PATENT DOCUMENTS

| | | |
|---|---|---|
| DE | 10157324 | 6/2003 |
| DE | 10201607 | 7/2003 |
| DE | 10315985 | 10/2004 |
| DE | 102006018953 | 10/2007 |
| DE | 102008015743 | 10/2009 |
| GB | 973506 | 10/1964 |

ELECTROMAGNETIC ACTIVE BRAKE

INCORPORATION BY REFERENCE

The following documents are incorporated herein by reference as if fully set forth: U.S. patent application Ser. No. 14/781,477, filed Sep. 30, 2015.

BACKGROUND

The invention is based on an electromagnetic active brake, for example a sliding caliper brake, which in the brake standby state, thus in the open state, is de-energized.

In order to avoid disadvantages connected to the use and securing of pneumatic or hydraulic energy, instead of pneumatic and hydraulic brake systems, electromagnetic brake systems are used in combination with springs. For example, it is already known for drives of overhead garage doors with an electric linear motor to use a sliding caliper brake for braking the transmission rod of the linear motor, which is pre-loaded in the engaged state. The free ends of the brake shoes are connected to the housing and/or the driven part of an electromagnet, with its armature being pre-loaded by a spring in the inward direction such that the brake pads in the idle state tightly contact at the side areas of the transmission rod. When the electromagnet is energized the brake pads are lifted off the transmission rod (DE G 83 08 714.1). This brake arrangement is advantageously applied where the operating condition is overwhelmingly in the static state, thus the brakes actively contact the parts to be braked, in the present case therefore they are de-energized and due to spring force they are in the brake position. Only for a relatively short period, here during the opening or closing of the garage door, they are released by an electric pulse. For a brief braking process, parts that are overwhelmingly in motion are not suitable for this technical solution, because in order to keep the brake open in the break readiness position energy must constantly be applied to the electromagnet, which results in high energy consumption.

It is further known to use a sliding caliper brake with a fixed and a mobile friction brake coating and an electro-mechanic actuator device for pushing its mobile friction brake coating against a brake disk. It comprises a device for adjusting the clearance with a helical compression spring, which axially impinges a tappet and resets the brake caliper when releasing the sliding caliper brake and this way it adjusts a clearance between the friction brake coatings and the brake disk at both sides of said brake disk (DE 10 2006 018 953 A1). The disadvantage of this sliding caliper brake is given in that the electromagnetic actuator device, which generally represents an electric engine, performs both the braking actions as well as the release of the brake, thus requires electric energy for both processes. Additionally, the torque of the electric engine must be converted via a transmission into a useable actuating moment. The electric engine and the transmission enlarge the design and increase the production costs of the sliding caliper brake.

The clasp brake, also de-energized in the braking state, comprising an automatic adjustment in case of the brake pad wearing down, is characterized in that for retightening a pre-loaded spring an additional path is used which the brake pads must travel for contacting the part to be braked after exceeding an adjustable wear tolerance limit, in addition to the previously set path. During the release of the brake the force of the pre-loaded spring is released by an energized electromagnet compressing the brake compression spring and, via a now engaging freewheel and/or via restressing elements, for example an eccentric shaft or nut sheath, the distance of the brake lever bearings is reduced in reference to each other such that the contacting path of the brake pads is shortened and thus the wear is compensated (DE 10 2008 015 743 A1).

A parking brake that is very compact and failsafe, and exhibits a largely wear-independent braking effect for fixing a rotary braking motion, comprising two brake pads, which can be actuated via a brake clasp. The arms of the brake clasp are connected via an actuator to a compression spring and the actuator in turn via a transmission lever to the armature of an electromagnet. In the de-energized state the spring presses the two brake pads against the part to be braked. For releasing the brake pads the electromagnet is energized, causing its armature to be moved towards the armature endplate and here pulling back the armature pin via the transmission lever of the actuator against the spring acting upon it such that the tension spring arranged between the brake arms pivots the two brake arms in the sense of disengaging the brake (DE 103 15 985 A1).

In these two technical solutions the disadvantage is given in the limitation of the application to such aggregates, machine parts, or transportation devices, which during their operating state must be frequently or regularly braked, such as escalators, elevators for persons or freight, rotating or translationally moving machine parts, and thus the active braking process must be performed in the de-energized state in order to allow failsafe braking even when the power supply is interrupted.

Further known is an emergency brake for a passenger conveyance system, for example an escalator, which at any time provides a braking force proportional to the load conveyed. In the operating state an electromagnet keeps the brake pads from engaging the brake disk. Pressure pistons connected to the electromagnet engage brake levers connected to the brake pads. The brake levers are additionally connected to adjustable compression springs, with their spring force being adjustable depending on the load of the conveyance system using a switchable electric engine (DE 694 19 124 T2).

The disadvantage of this emergency brake comprises that in order to maintain the operating state here the electromagnet must be electrified at all times, which results in relatively high energy consumption.

Further a floating caliper disk brake is known, acting as the active brake, for a motor vehicle with a brake fastener, fixed at the vehicle, a floating caliper supported displaceable at the brake fastener, a brake actuator arranged on a brake disk side for the direct impingement of braking force to at least one brake pad, as well as a device for adjusting the clearance. The brake pad located axially towards the outside is pre-loaded via tension springs in reference to the floating caliper leg. An electric stroke magnet is used as the adjustment device for compensating clearance, showing a armature, connected to a tappet, via which the adjustment force developing when energizing the stroke magnet is transmitted to the brake pad. The application of the tensile brake force may occur electromagnetically (DE 101 57 324 A1).

Finally, a disk brake is known with an actuating device, which is coupled via a self-enhancing device to at least one brake pad. A brake caliper embodied as a floating caliper encases a brake disk as well as the brake pads arranged at both sides of said brake disk. The actuating device comprises a translationally acting electromagnet with a coil, which when being energized generates an actuating force applied at the coil core for tightening the disk brake. A spring applied rigidly at the vehicle acts upon the self-enhancing device in such a manner that it is pre-loaded by the force of the spring, opposite the primary direction of rotation of the brake disk, so that the spring counteracts the effect of the self-enhancement. Consequently, when the tensile force of the brake is reduced, for example when the brake operation is concluded, the disk brake is released by the force of the spring in the disengaging direction. This way, a precisely dosed adjustment of the tensile braking force is possible using only one coil acting in a translational fashion. For this purpose, a control device is used, which allows a targeted control and/or electrification of the coil (DE 102 01 607 A1). The disadvantage of this disk brake is given in that for applying the braking force always a self-enhancing device is necessary, i.e. the actuation device itself, in the present case the electromagnet acting in a translational fashion, cannot generate the braking force to be applied upon the brake disk. The solenoid plunger magnet used in the actuator only serves as a control magnet for the brake booster. Additionally, the application thereof is limited to such devices and arrangements, with their process of motion requiring to be controlled via braking processes due to frequently changing events and situations, which for example is necessary when driving a vehicle.

SUMMARY

The electromagnetic active brake according to the invention shows here the advantage that it only requires electric energy for the braking process. In its static state, thus in the disengaged state, it is de-energized. For braking, here only for the introduction of the braking process, a targeted energy pulse is necessary in the form of a brief energy input. This way, the active brake according to the invention is very energy efficient, and thus also cost saving. It only requires 3% of the energy compared to pneumatic or hydraulic active brake systems.

Due to its low energy consumption the electromagnetic active brake can be used particularly advantageously in such arrangements, aggregates, or machines which are operating continuously over extended periods of time, i.e. in which parts constantly rotate or move in a translational fashion and only their motion needs to be stopped in case of malfunction or for maintenance purposes or emptying, such as wind energy devices, turbines, rotary kilns. In these applications the braking process represents only a fraction of the operating period. Further, the invention can also be used advantageously when the speed needs to be controlled in a targeted fashion, for example at test beds and centrifugal casting facilities of foundries.

Another advantage of the active brake is given in its very strong clamping force, which must be applied in reference to conventional safety brakes, e.g., a fail-safe brake. The high clamping force results from the fact that the braking process operates against the increasing pressure of a spring. This way it is also possible to considerably reduce the structural size of the active brake and thus produce it more cost effectively. By its compact design it requires little structural space and can also be fastened easier in the facilities, aggregates, or machines.

These advantages are achieved such that during the energizing of the electric magnet the braking process can occur independently from the path to be traveled by the armature to its stop at the armature endplate. During the brief energizing of the electromagnet its armature moves independently from the given status of the braking process, i.e. the given position of the brake pads in reference to the part to be braked, for example a brake disk, always to its armature endplate, so that the maximum tensile force of the electromagnet is available for the braking process. For this purpose, the armature is in an effective connection to the actual braking lever not directly, but via a spring compressor, which pushes at least one brake pad to the part to be braked. The armature is connected rigidly to the spring compressor, which therefore performs the same axial motion as the armature. The spring compressor in turn acts upon a spring, which rests with its opposite end on an abutment. This way, when a power pulse starts the braking process via the motion of the spring compressor connected to the armature, initially the pre-loaded spring is moved downwards unchanged together with its abutment. By an active connection of the abutment to the brake lever said lever is pushed downwards, resulting in at least one of the brake pads contacting the part to be braked. This way, the free, i.e. quasi forceless, motion of the spring compressor is concluded. Due to the fact that the armature in this position has not yet reached the armature endplate, thus has not yet assumed its stable position, the spring compressor is further entrained by the armature, with it now compressing the spring until it contacts the armature endplate. The spring force generated here is transmitted to the brake lever, which amplifies it via a lever arrangement and transmits it as a braking force via the brake pads upon the part to be braked.

After shutting off the power, the armature separates from the armature endplate, the spring relaxes and moves the brake lever and thus also the armature back into their normal position. When the brake lever or the spring compressor is fixed in its deflected position, the power can be shut off at the electromagnet without the brake pads separating from the part to be braked. This way, the brake implements the clamping function in a de-energized fashion, it quasi acts like a handbrake that has been pulled.

By interposing the spring compressor between the armature of the electromagnet and the brake lever moving the brake pad or brake pads, it is possible for the armature of the electromagnet to move into its stable position at the armature endplate, independently from the engagement of the brake pad or the brake pads at the part to be braked. As explained above, this way the armature compresses the spring via the spring compressor, which applies a braking force via the brake lever, determined by the spring force as soon as the brake pad or brake pads contact the part to be braked. This way, in addition to the possibility given by the support of the brake lever, via the adjustment of the preloading of the spring the strength of the braking force can be adjusted.

This way the spring accepts three functions:
1. Adjusting the braking force
2. Returning the spring compressor via the armature back into its normal position
3. Force-variable actuator between the magnetic armature and the armature endplate.

The electromagnetic active brake according to the invention can also be used as a spreading unit for drum brakes.

According to an advantageous embodiment of the invention the electromagnetic active brake is embodied as a floating caliper brake. This way, at both sides an equivalent engagement of the brake pads is yielded at the part to be braked.

According to another advantageous embodiment of the invention a compression spring is used as the spring. This part can be provided in the brake body underneath the spring compressor, resulting in a compact design.

According to a respectively advantageous embodiment of the invention the effective connection of the abutment with the brake lever comprises a guiding pin, arranged in an axially mobile fashion in the brake body and coaxially in reference to the compression spring, which is connected to a brace, which is connected in an articulate fashion via entraining cams (23) to the brake lever (2). Via the brace and the cams connected thereto the spring force is transmitted symmetrically to the brake lever, which transmits it to the brake pads, amplified by the two-sided lever arrangement showing the load arm longer by many times than the lever arm of the force. The cams engage the brake lever at both sides and are connected thereto in an articulate fashion.

By the guide pin the spring compressor and the compression spring are provided with additional guidance, which in turn increases the stability of the mobile assembly comprising the spring compressor, the spring, and the abutment, highly stressed by the electric pulse. The abutment is adjustable and can be fixed by the guide pin in a form and/or force-fitting fashion via means, for example by a counter nut or a set screw, acting radially upon the guide pin. The pre-loading force of the compression spring can be easily adjusted by changing the axial position of the abutment at the guide pin. Due to the fact that the adjusted spring force acts upon the brake lever, therefore the braking force is also adjusted. Depending on the spring compressor, further compressing the strongly or weakly pre-loaded spring over a path extending synchronous in reference to the armature when the electromagnet is energized here the braking force will also be strong or weak.

According to an also advantageous embodiment of the invention the guide pin is accepted with its upper end by a guide bore of the spring compressor. With its lower end it is connected rigidly to a sheath, which is axially guided in the brake housing. This way an axially parallel guidance is yielded between the spring compressor, the spring, and the abutment.

According to another advantageous embodiment of the invention the axial position of the spring compressor is also adjustable and can be fixed in reference to the brake body of the active brake. Due to the fact that the brake lever is in operative connection with the spring compressor, the brake lever is also kept in its position such that the brake pads remain at the part to be braked as well. In this state, the armature has also assumed its stable position at the armature endplate so that the energy supply to the electromagnet can be shut off without this resulting in the braking effect weakening. The electromagnetically active brake therefore acts like a mechanic hand brake.

The axial adjustment and fixation of the spring compressor can be easily realized via a threaded pin that can be guided through it and screwed into the brake body.

In another advantageous embodiment of the invention a return spring is arranged between the brake lever and the brake body, which at the end of the braking process pushes the brake lever back into the normal position, and due to the effective connection, via the spring compressor also the armature. By the large transmission ratio when transmitting the brake force via the brake lever, here even minor clearance of its bearing in the brake body has negative consequences upon the complete return of the armature. In order to keep constant the clearance between the part to be braked and the brake pads the armature must always be returned into its normal position. For this purpose, the above-mentioned return spring compensates the clearance in the bearing of the brake lever. The return spring can advantageously be arranged coaxially in reference to the above-mentioned threaded pin in a space-saving fashion.

According to another advantageous embodiment of the invention the brace is supported via at least one additional lower return spring at the brake body of the active brake. Although at least one return spring must also be compressed by the force of the electromagnet, in turn here at the end of the braking process it supports the return of the brake lever, the spring compressor, and thus also the armature. Simultaneously it compensates the clearance of the bearing of the brace.

According to a particularly advantageous embodiment of the invention the effective connection of the abutment to the brake lever comprises a spring spindle, guided coaxially in reference to the compression spring through the spring compressor, which is guided therein in an axially mobile fashion. At its upper end, projecting from the spring compressor, the spring spindle comprises a collar, which rests via a counter roll on the brake lever. The spring spindle is guided via friction bearings in the spring compressor and is adjustable. In this embodiment of the effective connection, the abutment is also arranged in an axially adjustable fashion at the spring spindle and can be fixed. This embodiment of the effective connection of the abutment with the brake lever is simpler and can be produced more cost-effectively than the variant of the assembly using the brace and the cams. Additionally the flux of force is transmitted over shorter paths and more directly upon the brake lever, considerably reducing the clearance at the transmission path compared to the first embodiment.

Additional advantages and advantageous embodiments of the invention are discernible from the following description, the drawing, and the claims.

BRIEF DESCRIPTION OF THE DRAWINGS

In the following the objective of the invention is shown in the drawing using the example of a floating caliper brake and is explained in greater detail. Shown are.

DETAILED DESCRIPTION OF THE PREFERRED EMBODIMENTS

Figure 1:
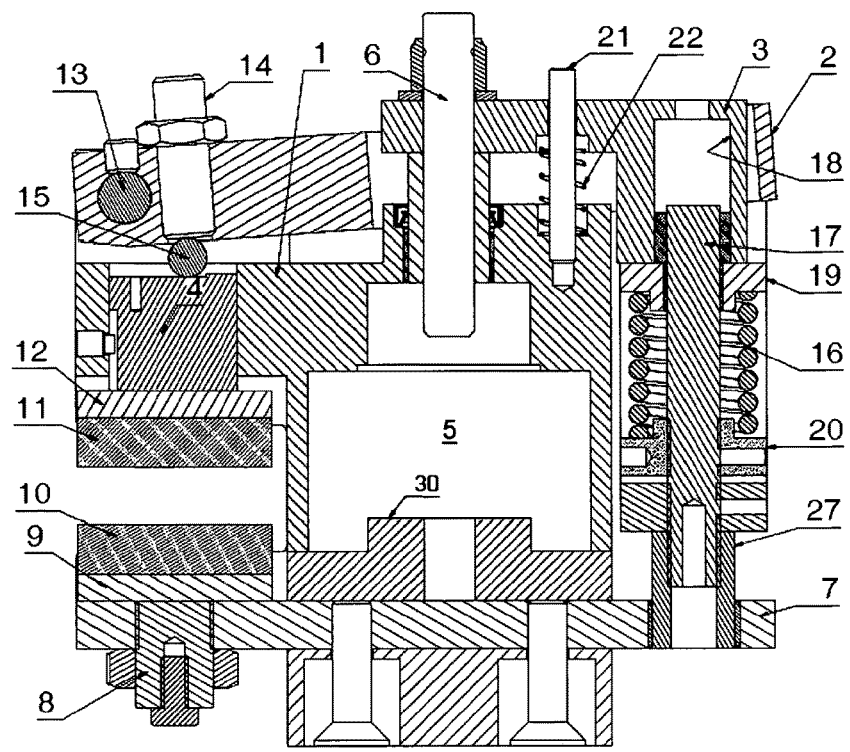
FIG. 1 a cross-section through an electromagnetic active brake according to the invention in the open state, FIG. 2 a cross-sectional illustration of the effective connection between the brake lever and the spring compressor, FIG. 3 the electromagnetic active brake in the active state, FIG. 4 the detail of the cam of FIG. 2 in the active state, FIG. 5 a second embodiment of the locking of the brake lever, FIG. 6 a cross-sectional illustration of a second embodiment of the effective connection between the brake lever and the spring compressor, and FIG. 7 a rear view of the second embodiment in a cross-sectional detail.

FIG. 1 shows in a cross-section an electromagnetic floating caliper brake in the open or the disengaged state, thus ready to brake. It comprises a brake body 1, a brake lever 2, connected thereto with one end and pivotal in the vertical direction, a spring compressor 3, mobile perpendicularly in reference to the brake body 1, a pressure part 4 guided perpendicular in the brake body 1, as well as an electromagnet, with its magnetic coils 5 being arranged inside the brake body 1 and with its armature spindle 6 engaging rigidly the spring compressor 3 and being guided vertically mobile in the brake body 1. From the cross-sectional illustration of FIG. 5 it is discernible that the armature spindle 6 is connected in its axial extension rigidly to the armature 6' of the electromagnet, which in turn is guided in a armature spindle 6" arranged rigidly inside the brake body 1. The brake body 1, the brake lever 2, the brake compressor 3, and the pressure part 4 encase the magnetic coils 5 as a compact unit.

The brake body 1 is fastened on a base plate 7, which accepts in a vertical extension of the pressure part 4 via a lower adjustment screw 8 a lower brake shoe 9 in a rigid, but adjustable fashion. A lower brake pad 10 is fastened on the lower brake shoe 9. An upper brake pad 11 is fastened above it via an upper brake shoe 12 at the pressure part 4. In the interim space, limited by the upper and the lower brake pad 10, 11, a brake means to be braked, not shown here, can be positioned, for example a rotating brake disk or a linearly moving part, e.g., a rope, a chain, or a rod.

As mentioned above, a brake lever 2 is supported pivotally in the brake body 1. The support occurs at the end of the brake lever 2, at which the pressure part 4 is located, via a pivotal pin 13. Directly next to the pivotal pin 13, above the pressure part 4, the brake lever 2 comprises an adjustment pin 14 projecting through it, with its lower face resting on a pressure pin 15, supported in a groove of the pressure part 4.

In the area opposite the pivotal bearing the brake lever 2 is connected in an articulate fashion via a cam, not shown in greater detail in FIG. 1, as well as a compression spring 16 to the spring compressor 3, guided axially in the brake body 1, so that in case of an axial motion of the spring compressor 3 by the cam it is moved in the same direction and thus executes its pivotal motion about its pivotal pin 13 upwards or downwards. Depending on the setting of the compression spring 16 this pivotal motion occurs simultaneously to the spring compressor 3 or in a delayed fashion.

Figure 3:
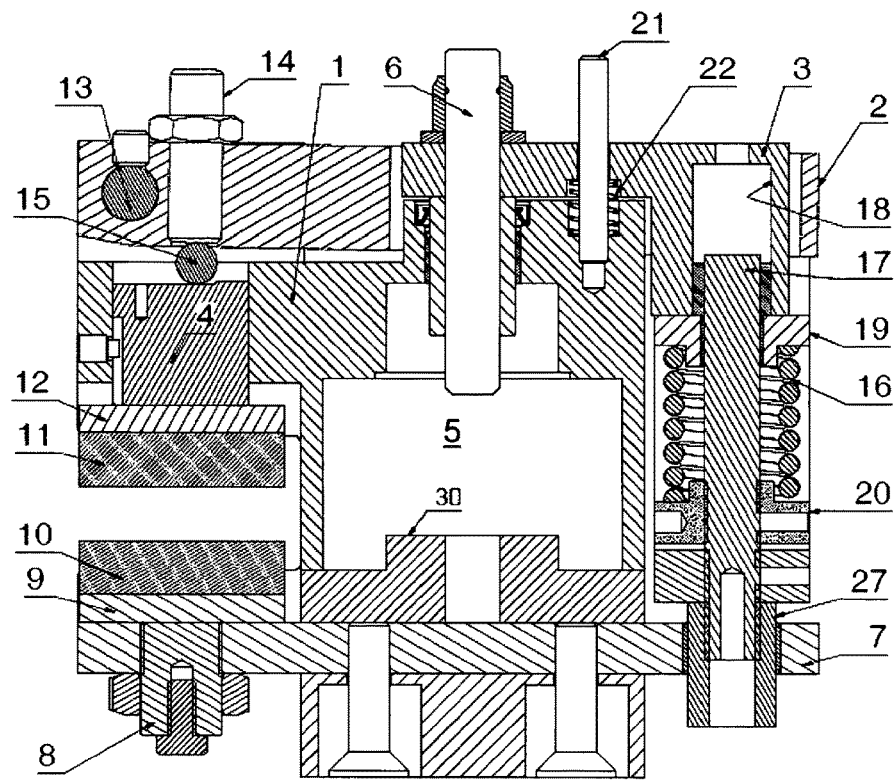

The spring compressor 3 extends horizontally from the armature spindle 6 along the brake lever 2 beyond the brake body 1 and has in this area a second guide in reference to the brake body 1. In FIGS. 1 and 3 this guide is ensured by a guide pin 17, arranged axially mobile in the base plate 7, which pin is coaxially guided through the compression spring 16 and projects with its free end into a guide bore 18 of the spring compressor 3. The face of the spring compressor 3 remaining by the guide bore 18 rests on an upper spring abutment 19, arranged coaxially in reference to the guide pin 17, with the compression spring 16 abutting it with its upper end. At its lower end the compression spring 16 rests on a lower abutment 20, which is adjustable and can be fixed at the guide pin 17 in the axial position. In the present example the guide pin 17 is provided with an external thread so that the abutment 20 can be screwed onto it like a nut. The fixation of the abutment 20 occurs in a self-locking fashion by the force of the compression spring 16.

In the present exemplary embodiment, a threaded pin 21 is provided with an upper return spring 22 for the manual operation of the floating caliper brake in the brake body 1, which upon the conclusion of the braking process returns the spring compressor 3 into its normal position.

Figure 2:
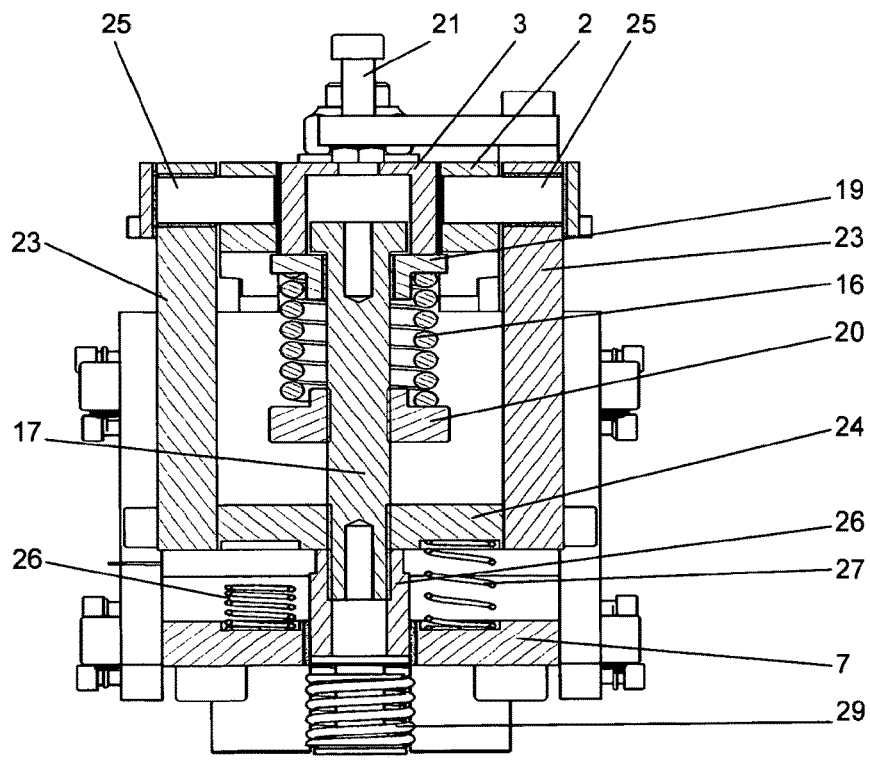

FIG. 2 shows the detail of a cam for the articulate connection of the spring compressor 3 to the brake lever 2. The cam comprises two parallel guided centering flanges 23, which are connected rigidly to each other via a brace 24. With their free ends they are connected in an articulate fashion via a brace bearing 25 to the brake lever 2. The brace 24 is supported via lower return springs 26 on the base plate 7. The brace 24 is provided centrally with an aperture, through which the guide pin 17 is guided. On its end projecting through the aperture a clamping sheath 27 is screwed on, by which the pin is connected rigidly to the brace 24. The clamping sheath 27 is received in the base plate 7 in an axially mobile fashion, so that the guide pin 17 is also guided in an axially mobile fashion in reference to the base plate 7 and, as mentioned above, consequently also in the brake body 1.

The brake body 1 is fastened with its base plate 7 via screws 28 and damping springs 29 at an arrangement, not shown in greater detail, in a vibration-cushioning fashion.

Figure 4:
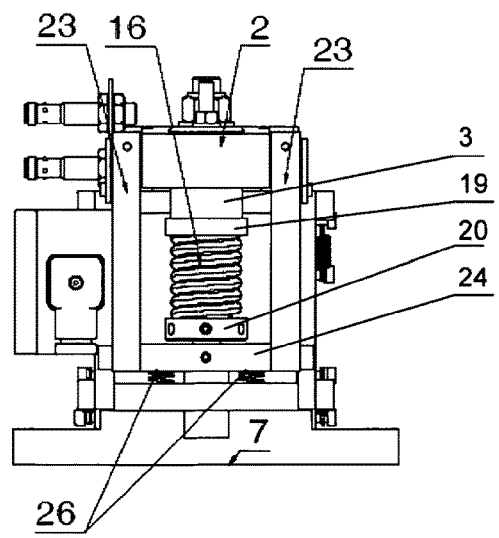
Figure 5:
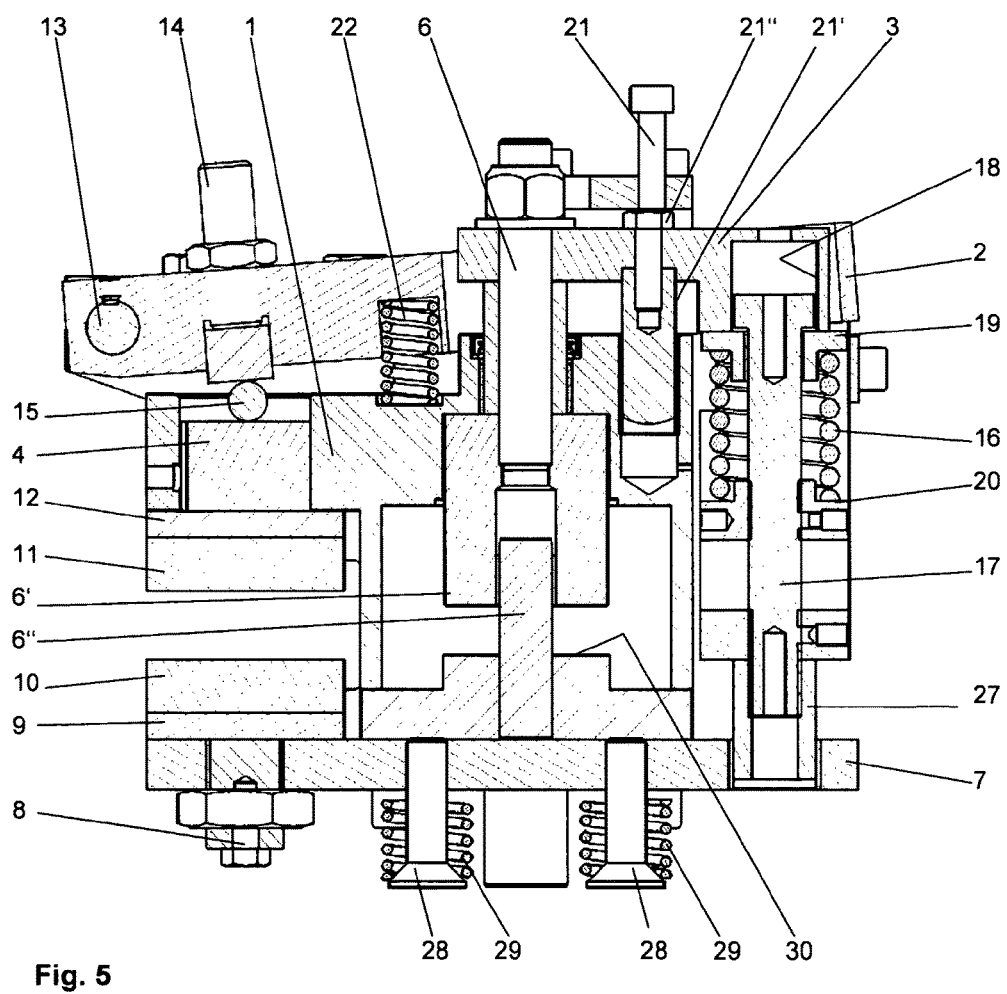

In the active state, thus in the braking state of the electromagnetic floating caliper brake shown in FIGS. 3 and 4, as well as in the embodiments according to FIG. 5, in order to identify the same components the same reference characters were used as in FIGS. 1 and 2. The variant of FIG. 5 differs from the one shown in FIG. 1 by the separate arrangement of the upper return spring 22 in the brake lever 2 between the armature spindle 6 and the bearing of the brake lever 2. Further, the threaded pin 21 provided for fixing the spring compressor 3 in reference to the brake body 1 is connected to the guide pin 21', which can be screwed into the brake body 1. The threaded pin 21 is fixed in reference to the brake body 1 via a set screw 21".

In this cross-sectional illustration the guide of the armature 6' is also discernible in the interior armature spindle 6" as well as the connection of the armature spindle 6 to the armature 6'.

In the following, the operation of the electromagnetic floating caliper brake is described:

FIGS. 1, 2, and 5 show the electromagnetic floating caliper brake in the opened and/or disengaged state, in which it is de-energized. When energizing the magnetic coils 5 the armature 6' moves in the direction of its armature endplate 30, which is located in the lower area of the electromagnet, also causing the spring compressor 3 to move perpendicularly downwards, as discernible from FIGS. 3 and 4, while it simultaneously moves the guide pin 17, guided through the clamping sheath 27 in the base plate 7 and the pre-loaded compression spring 16 between the upper spring endplate 19 and the lower abutment 20, without compressing the latter due to its adjusted pre-loading. In the variant of FIG. 2 the pre-adjusted force of the compression spring 16 is transmitted to the brake lever 2 via the brace 24 connected rigidly to the guide pin 17 as well as the two cams 23 fastened at the brace 24. Here, the adjustment pin 14, connected rigidly to the brake lever 2, presses upon the pressure pin 15 such that the upper brake pad 11 is moved in the direction of the lower brake pad 10, reducing the clearance between the two brake pads 10, 11 and the brake pads 10, 11 contact the brake means, not shown. At this point of time and/or this position of the brake lever 2 the armature 6' has not yet reached the armature endplate 30 so that from now on, thus at the time the brake pads 10, 11 contact the brake means to be braked, during the remainder of the path towards the armature endplate 30 it overcomes the pre-loaded clamping force of the compression spring 16 and compresses the compression spring 16 via the spring compressor 3. In this further downward motion of the spring compressor 3 only the compression spring 16 and/or in the variant of FIG. 2 the lower return springs 26 are further compressed, causing the compression of the brake pads 10, 11 to increase upon the brake means to be braked, i.e. the actual braking processes to occur. The guide pin 17 itself and thus also the brake lever 2 are not moving any longer.

In order to remove the braking process the electromagnet is switched to be de-energized, causing the armature endplate 30 to lose its adhesive force in reference to the armature 6'. This way the compression spring 16 relaxes, with simultaneously the spring compressor 3, the armature 6' with the armature spindle 6, and the brake lever 2 being compressed into the normal state. In the alternative embodiment according to FIG. 2 the lower return springs 26 support the reverse pivoting of the brake lever 2 into its normal state.

Figure 6:
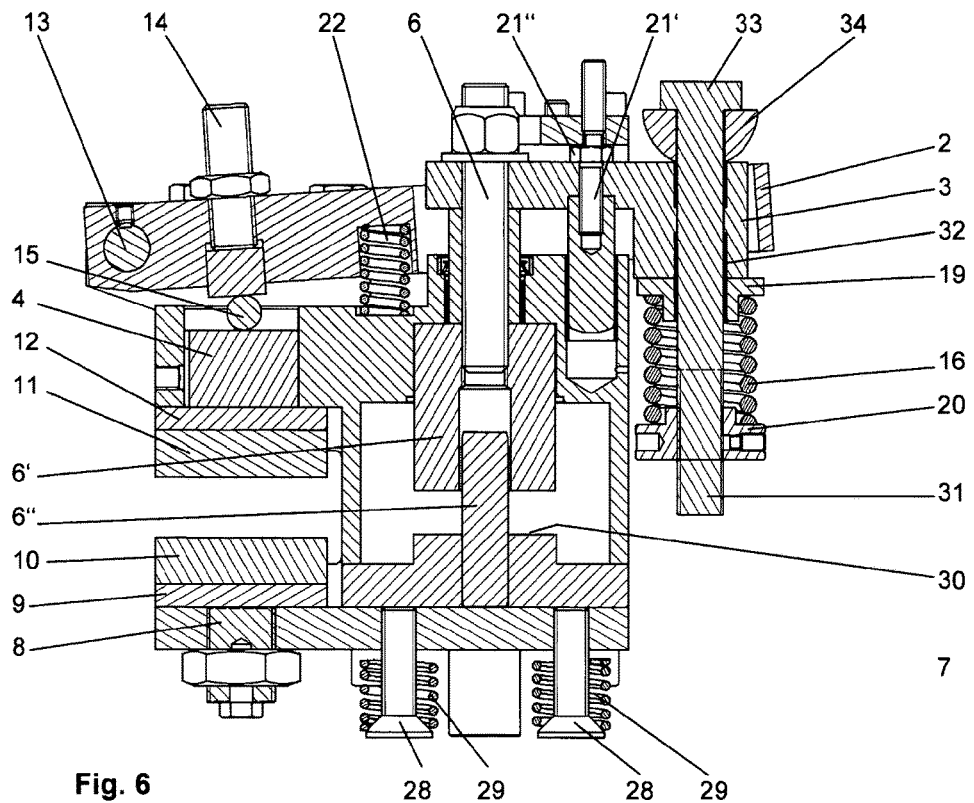
Figure 7:
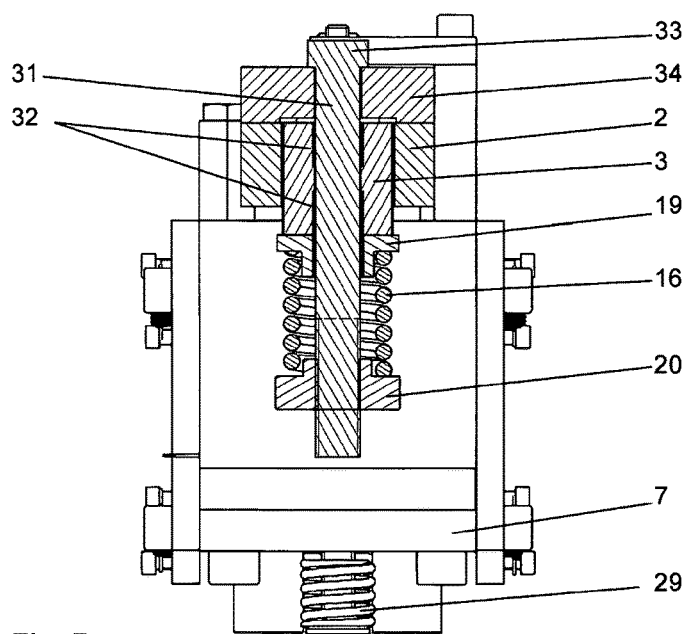

FIGS. 6 and 7 show a second embodiment of the effective connection between the brake lever 2 and the spring compressor 3. Instead of the guide pin 17 guided in the brake body 1, a spring spindle 31 is guided through the spring compressor 3 and coaxially through the compression spring 16. It is axially guided in the spring compressor 3 via friction bearings 32 and has at its upper end a collar 33 projecting from the spring compressor. It is further guided through the brake lever 2 as well as a pressure roll 34 resting thereupon, on which the annular area of the collar 33 is supported. Similar to the first embodiment, the upper spring step 19 and the abutment 20 are fastened at the spring spindle and the compression spring 16 is clamped between the two of them.

The general function of this embodiment is equivalent to the variant already described regarding FIGS. 1 to 5. The advantage is given here in that the effective connection between the brake lever 2 and the spring compressor 3 occurs directly in an axial connection via the spring spindle 31 as well as the pressure roll 34, and thus over a considerably shorter path than in the first variant via the brace 24 and the cams 23. In this embodiment as well the spring compressor 3 presses with its annular area upon the upper spring stop 19 when the electromagnet is energized, causing the spring spindle 31 connected thereto in a rigid fashion to move axially downwards and here pivoting the brake lever 2 via the pressure roll 34 downwards until the brake pads 10, 11 contact the part to be braked. In a further downwards motion of the armature 6 the spring compressor 3 compresses the compression spring 16 until it contacts the armature endplate 30, resulting in the braking force developing, as already described. After the power has been shut off, the armature 6 separates from the armature end plate so that the spring compressor 3 and the armature 6 are pressed back into their normal position during the relaxing of the compression spring 16, causing the pressure roll 34 also to be released from the collar 33 of the spring spindle 31 such that the upper return spring can move the brake lever 2 back into its normal position.

All features shown here may be relevant for the invention either individually or in any combination with each other.

LIST OF REFERENCE CHARACTERS

1 Brake body
2 Brake lever
3 Spring compressor
4 Pressure part
5 Magnetic coil
6 Armature spindle
6' Armature
6" Internal armature spindle
7 Base plate
8 Lower adjustment spring
9 Lower brake shoe
10 Lower brake pad
11 Upper brake pad
12 Upper brake shoe
13 Pivotal bolt
14 Adjustment pin
15 Pressure pin
16 Compression spring
17 Guide pin
18 Guide bore
19 Upper spring endplate
20 Lower abutment
21 Threaded pin
21' Guide pin
21" Set screw
22 Upper return screw
23 Cams
24 Brace
25 Brace bearing
26 Lower return spring
27 Clamping spring
28 Screws
29 Damping screw
30 Armature endplate
31 Spring spindle
32 Friction bearing
33 Collar
34 Pressure roll

The invention claimed is:

1. An electromagnetic active brake, comprising:
a brake body;
a brake device with at least two opposite brake shoes, which in a power-off state of the active brake are distanced from a part to be braked, wherein in order to initiate a braking process one of the brake shoes is movable via a brake lever in a direction towards the other brake shoe, that is mounted fixed in position relative to the brake body;
an electromagnet arranged in the brake body, with an armature thereof being in an indirect operative connection with the brake lever via a spring compressor, compression spring and abutment;
the armature of the electromagnet is connected rigidly to the spring compressor;
the spring compressor is guided in the brake body, and upon energizing the electromagnet, the spring compressor is movable by the armature in an axial direction of the armature and compresses the compression spring against the abutment, until the armature reaches an end stop position defined by an armature endplate; and
the abutment is in operative connection with the brake lever such that in an energized state of the electromagnet the compression spring being compressed by the spring compressor forces the abutment against the brake lever thereby transmitting the spring force of the compression spring to the brake lever to exert a braking force.

2. The electromagnetic active brake according to claim 1, wherein the electromagnetic active brake is a floating caliper brake.

3. The electromagnetic active brake according to claim 1, further comprising a base plate, and the brake body and the other brake shoe are mounted to the base plate.

4. The electromagnetic active brake according to claim 3, wherein the operative connection of the abutment to the brake lever comprises a guide pin arranged in the brake body coaxially to the compression spring and axially movable, said guide pin is connected rigidly to a brace, which is connected in an articulate fashion via cams to the brake lever.

5. The electromagnetic active brake according to claim 4, wherein the abutment is axially adjustable and fixed at the guide pin.

6. The electromagnetic active brake according to claim 5, wherein a pre-load of the compression spring is adjustable by changing an axial position of the abutment at the guide pin.

7. The electromagnetic active brake according to claim 4, wherein the guide pin is received in a guide bore of the spring compressor and is axially guided in the brake housing via a clamping sheath connected rigidly to the guide pin.

8. The electromagnetic active brake according to claim 1, wherein an axial position of the spring compressor is fixable in reference to the brake body of the active brake.

9. The electromagnetic active brake according to claim 8, wherein the axial position of the spring compressor is fixable via a threaded pin that is screwed into the brake body.

10. The electromagnetic active brake according to claim 9, wherein a return spring is arranged between the brake lever and the brake body.

11. The electromagnetic active brake according to claim 10, wherein the return spring is arranged coaxially in reference to the threaded pin.

12. The electromagnetic active brake according to claim 4, wherein an axial position of the spring compressor is fixable in reference to the brake body of the active brake via a threaded pin that is screwed into the brake body, a return spring is arranged between the brake lever and the brake body coaxially in reference to the threaded pin, and the brace is supported via at least one additional return spring at the brake body of the active brake.

13. The electromagnetic active brake according to claim 1, wherein the effective connection of the abutment with the brake lever comprises a spring spindle guided through the spring compressor coaxially in reference to the compression spring, said spring spindle is guided axially in a mobile fashion, and has a collar at an upper end thereof projecting from the spring compressor, which rests via a pressure roll on the brake lever.

14. The electromagnetic active brake according to claim 13, wherein the abutment is axially adjusted and fixed at the spring spindle.

15. The electromagnetic active brake according to claim 1, wherein in a de-energized state of the electromagnet, the compression spring is pre-loaded and wherein upon energizing the electromagnet, the spring compressor is movable by the armature in an axial direction of the armature to initially move the compression spring together with the abutment, without further compression of the spring, to a brake ready state in which a clearance between the brake pads and the part to be braked is taken up, and then compresses the spring against an abutment, which is moved into operative connection with the brake lever for braking of the part to be braked.

* * * * *